United States Patent [19]

Leonardi

[11] 4,257,362

[45] Mar. 24, 1981

[54] METHOD AND APPARATUS FOR VARYING THE FUEL RATIO OF AN AIR-FUEL MIXTURE

[76] Inventor: Samuel Leonardi, 809 NW. 7th Ter., Ft. Lauderdale, Fla. 33311

[21] Appl. No.: 931,948

[22] Filed: Aug. 8, 1978

[51] Int. Cl.³ .................................................. F02D 7/00
[52] U.S. Cl. .................................... 123/392; 123/572; 123/585; 180/54 R
[58] Field of Search ........... 123/103 B, 119 C, 119 B, 123/124 R, 106; 180/108, 110, 105 E

[56] References Cited

U.S. PATENT DOCUMENTS

| | | | |
|---|---|---|---|
| 1,212,745 | 1/1917 | Crockett | 123/103 B |
| 3,059,628 | 10/1962 | Linn | 123/119 B |
| 3,092,091 | 6/1963 | Bosley | 123/119 B |

*Primary Examiner*—Wendell E. Burns
*Attorney, Agent, or Firm*—Cushman, Darby & Cushman

[57] ABSTRACT

A method and apparatus for varying the fuel ratio of an air-fuel mixture supplied to the carburetor of an internal combustion engine. In a first embodiment, a valve opens and closes a port in an aluminum block between a passage coupled to the PCV and carburetor and a second passage open to the atmosphere. A spring in the second passage modulates the air flow as a function of vacuum pressure and thermally responsive means maintains the valve closed until the engine reaches its operating temperature. In a second embodiment the valve is opened as a function of the wind pressure produced during vehicle movement.

5 Claims, 4 Drawing Figures

METHOD AND APPARATUS FOR VARYING THE FUEL RATIO OF AN AIR-FUEL MIXTURE

The present invention relates to an apparatus for varying the fuel ratio of a fuel-air mixture supplied to the carburetor of an internal combustion engine.

Conventional internal combustion engines of the type which utilize a carburetor are usually provided with a pollution control valve (PCV) which scavages vapors from the crankcase and is connected to the carburetor to return those vapors for combustion. Further, internal combustion engines of this type often run on an unnecessarily rich mixture resulting in combustion of more gasoline than is necessary to power the vehicle. Thus, gas mileage can be increased by adding additional air to the air-fuel mixture to reduce the richness of the same, particularly as the speed of the vehicle increases.

There have been many attempts in the past to carry out this objective. The patents to Amos U.S. Pat. No. 3,973,534, Bitterman et al U.S. Pat. No. 3,990,420, and Dolphi, Sr. U.S. Pat. No. 3,967,605, all describe arrangements of this type in which a valve is arranged to control flow of air into a connection between a PCV valve and a carburetor as a function of the vacuum in the engine.

A richer engine mixture is also required when the engine is operating cold. Thus, it is desirable to render this type of device inoperative during initial starting conditions. The patent to Green, e.g., U.S. Pat. No. 2,342,046, describes an apparatus of this type in which additional air is added to the carburetor with a valve which is maintained closed until the engine reaches its operating temperature.

The present invention as described in detail below relates to a simple attachment for an internal combustion engine of the type which utilizes a PCV and a carburetor. According to a first embodiment of the present invention as discussed in greater detail below, a block of metal, e.g., aluminum, is provided with a first inlet in connection with the atmosphere, a second inlet for connection to a pollution control valve, and an outlet for connection to the carburetor. The inlet in communication with the atmosphere is connected to the inlet from the pollution control valve and the outlet to the carburetor, by a passage terminating in a port. A valve is disposed for movement in the passage to open and close the port and to vary the air flow from the atmosphere to the carburetor. A spring engages the valve to urge the valve closed while the engine is cool. A thermally responsive device such as a "power pill" is also disposed in the passage to engage the valve to open the valve against the urging of the spring when the engine has reached its operating temperature. A further spring disposed in the passage between the atmospheric inlet and the outlet to the carburetor modulates the valve in its open position as a function of the engine vacuum to vary the air supplied as a rough function of the vehicle speed. Cooling fluid of the internal combustion engine is circulated past the block to transfer heat thereto so that the "power pill" operates to open the port whenever the engine reaches a predetermined temperature.

According to a second embodiment of the invention, the block is provided with a "wind gate" at the front thereof which is directly connected to the valve to open the connection between the atmosphere and the outlet to the carburetor for supplying an amount of air to the carburetor which varies as a function of the position of the wind gate, which position is determined by the speed of the vehicle. The wind gate is intended to be mounted at the front of the vehicle so as to be responsive to the air pressure produced by movement of the car along a highway.

Many other objects and purposes of the invention will be clear from the following detailed description of the drawings.

DETAILED DESCRIPTION OF THE DRAWINGS

Figure 1:
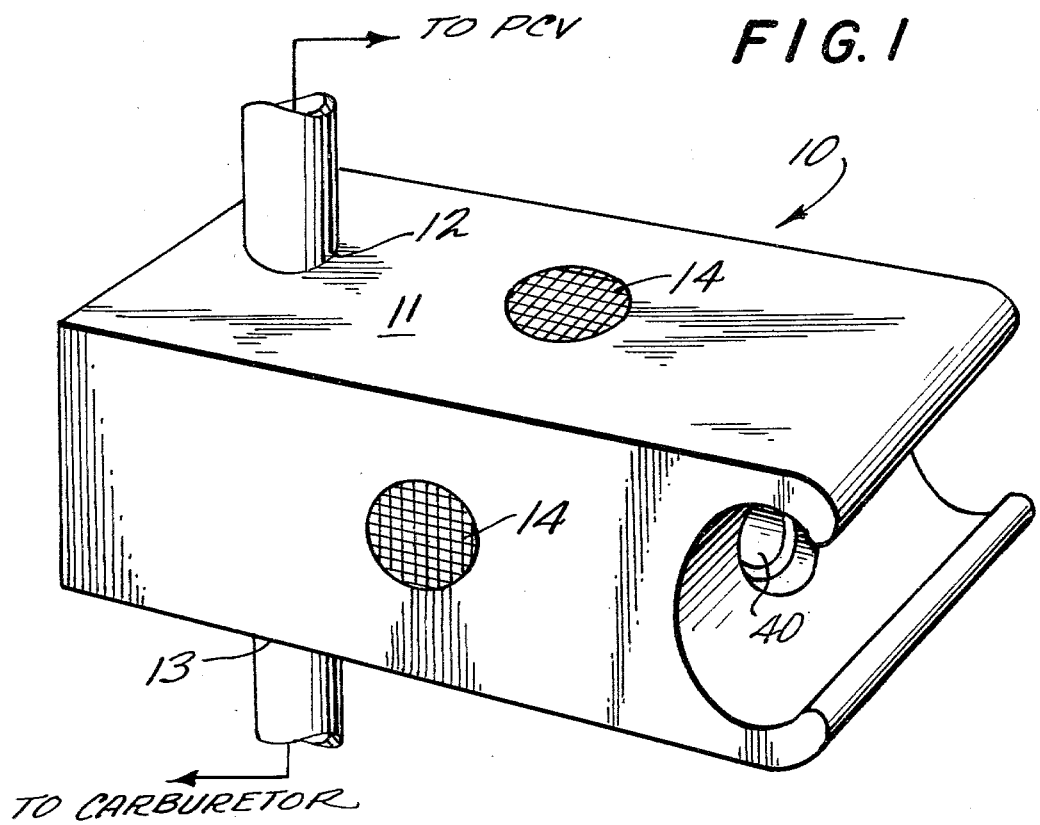
FIG. 1 shows a perspective view of a first embodiment of the present invention.
Figure 2:
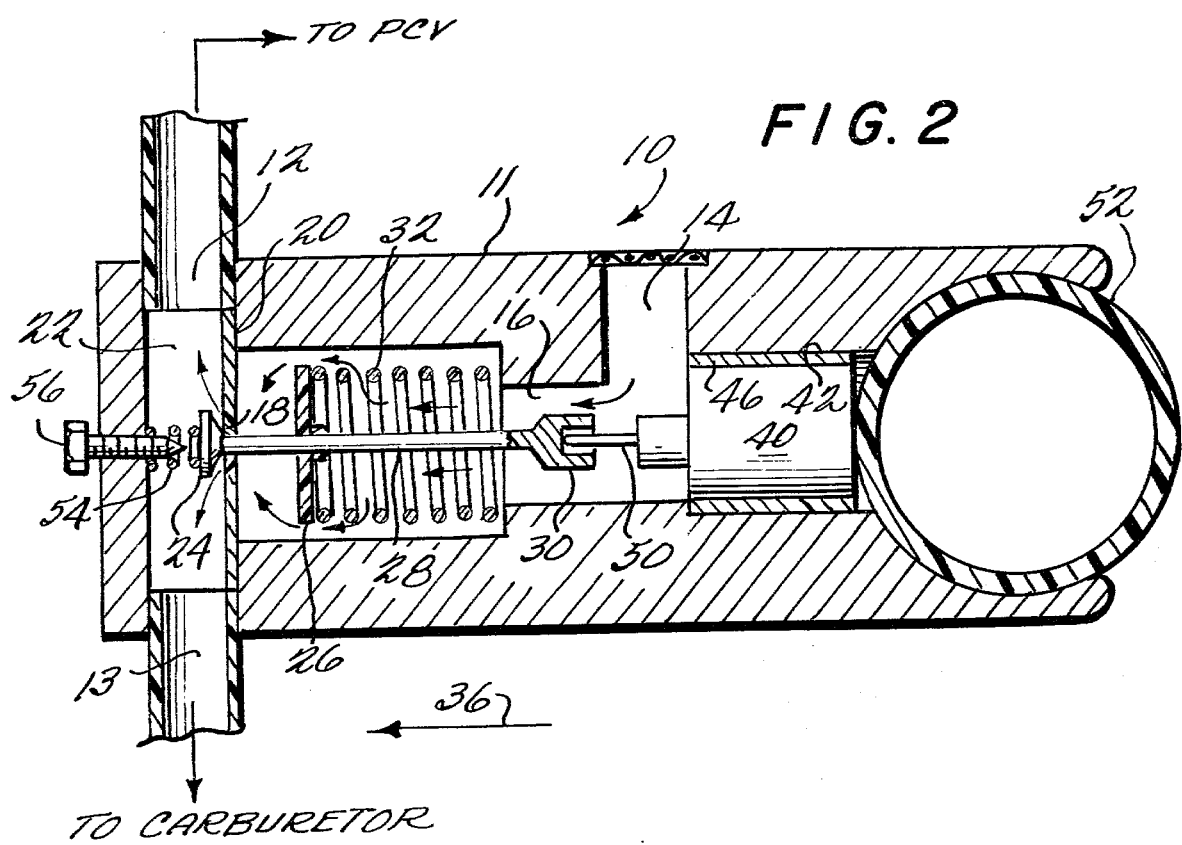
FIG. 2 shows a sectional view of the embodiment of FIG. 1.

Reference is now made to FIGS. 1 and 2 which illustrate a first embodiment of the present invention. The unique apparatus 10 of the present invention includes an aluminum block 11 which is provided with an inlet 12 for connection to a PCV and an outlet 13 for connection to the carburetor down-stream of the butterfly valve. Another inlet 14 is provided with access to the atmosphere. Passage 16 connects inlet 14 to inlet 12 and outlet 13 via port 18 which is defined by an insert 20 held in passage 22 by any suitable means.

A valve including valve seat 24, flange 26, stem 28 and cup-shaped terminal 30 is mounted for movement within passage 16. Spring 32 engages flange 26, which may be provided with apertures or otherwise arranged so that air can pass therethrough, to urge the valve in the direction of arrow 36 in FIG. 2 and toward a position which permits air to flow from the inlet 14 to the outlet 13 and to produce a leaner mixture for the carburetor, thus increasing gas mileage. Flange 26 cuts off flow of air to outlet 13 from inlet 14 under high engine operating conditions.

A thermally responsive device such as power pill 40 is arranged in bore 42 of block 11 and surrounded by a copper sleeve 46 which aids in transfer of heat to the power pill. One suitable device in that regard is manufactured by the Robert Shaw Controls Company under the model number 98444-C. Such device includes a stem 50 which is moved outward as the power pill heats. Stem 50 engages the cup-like terminal 30 of the valve stem 28 to urge the valve in the direction of arrow 36 in FIG. 2 and to open port 18 when the engine has reached its operating temperature. Block 11 is provided with the slot at one end into or adjacent which a hose 52 carrying cooling water of the engine is arranged so that heat from that cooling water is transferred to the power pill 40 when the engine has reached operating conditions to permit the valve to open. Spring 54 urges the valve toward a closed position and closes the valve when the engine has cooled off. Spring 50 is disposed around a set screw 56 which can be adjusted to vary the maximum opening of the valve.

When the power pill has opened the valve against the urging of spring 54, then variations in vacuum at the output 13 will modulate the air flow from inlet 14 under the control of spring 32 which urges the valve toward an open position.

Figure 4:
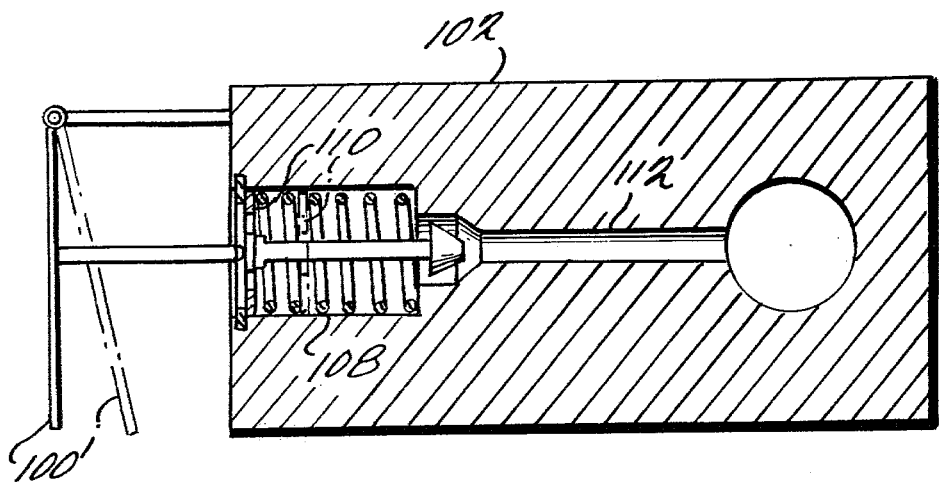
FIG. 4 shows a sectional view of the second embodiment.
Figure 3:
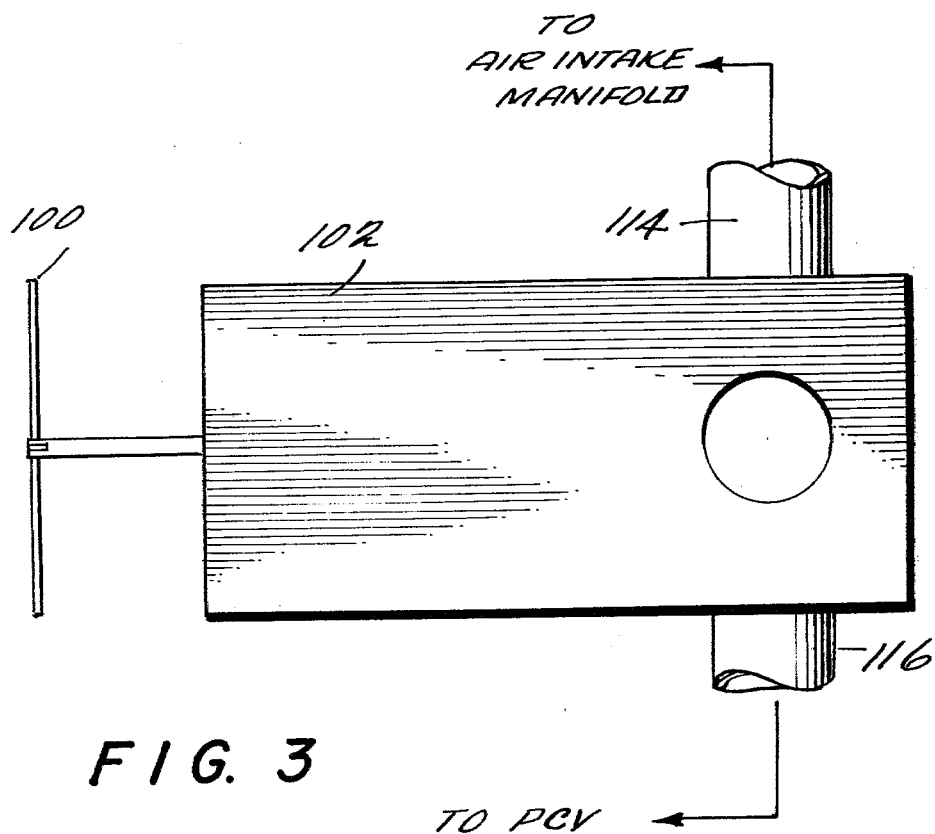
FIG. 3 shows a perspective view of the second embodiment of the invention.

Referring to FIGS. 3 and 4, these Figures illustrate a second embodiment of the invention in which the amount of air supplied to the air intake manifold of the carburetor varies as a function of the speed of the vehicle. That speed is detected by a gate 100 which is pivotably mounted on the front of block 102, e.g., in front of the radiator of a vehicle, so that its position and the opening of port 104 vary directly as a function of the air pressure incident upon gate 100. Spring 108 urges valve seat 110 toward a closed position. Block 102 is provided with an internal bore 112 which connects port 104 to lines 114 and 116 which respectively are connected to the air intake manifold and the PCV valve. In this embodiment of the invention, there is no variation of the air-flow with engine temperature.

Many changes and modifications in the above-described embodiments of the invention can, of course, be carried out without departing from the scope thereof. Accordingly, that scope is intended to be limited only by the scope of the appended claims.

What is claimed is:

1. A method of varying the fuel ratio of a fuel-air mixture supplied to a carburetor comprising the steps of:
   detecting the wind resistance of a vehicle as it moves;
   adding additional air to the carburetor as the detected wind resistance increases.

2. A method as in claim 1, wherein said step of adding includes opening a valve connecting the atmosphere to a passage between a PCV and said carburetor.

3. An apparatus for varying the fuel ratio of a fuel-air mixture supplied to a carburetor of an internal combustion engine of a vehicle having a radiator at the front end thereof, a pollution control valve and a carburetor, said apparatus comprising:
   a block of metal disposed behind said radiator having a first inlet in communication with the atmosphere, a first internal passage between a second inlet for connection to said pollution control valve and an outlet for connection to said carburetor, and a second passage opening into said first passage at a port and connected to said first inlet;
   valve means disposed in said second passage and having a seat for closing said port; and
   wind gate means disposed in front of said radiator directly exposed to said atmosphere, mounted on said block, for pivotal motion in response to air pressure produced by vehicle movement, said gate means being connected to said valve means for opening said port as said gate means pivots.

4. An apparatus as in claim 3, wherein said block is aluminum.

5. In combination, a motor vehicle having a radiator at the front end thereof, a pollution control valve and an internal combustion engine having carburetor; and an apparatus for varying the fuel ratio of a fuel-air mixture supplied to said carburetor, said apparatus comprising:
   a block of metal disposed behind said radiator having a first inlet in communication with the atmosphere, a first internal passage between a second inlet for connection to said pollution control valve and an outlet for connection to said carburetor, and a second passage opening into said first passage at a port and connected to said first inlet;
   valve means disposed in said second passage and having a seat for closing said port; and
   wind gate means disposed in front of said radiator directly exposed to said atmosphere, mounted on said block, for pivotal motion in response to air pressure produced by vehicle movement, said gate means being connected to said valve means for opening said port as said gate means pivots.

* * * * *